J. G. WILSON.
ROLLING SHUTTERS.

No. 184,944. Patented Nov. 28, 1876.

Witnesses
Otto Hufeland.
Robt E. Miller

Inventor.
James G. Wilson
by
Van Santvoord & Hauff
his attorneys

UNITED STATES PATENT OFFICE.

JAMES G. WILSON, OF NEW YORK, N. Y.

IMPROVEMENT IN ROLLING SHUTTERS.

Specification forming part of Letters Patent No. 184,944, dated November 28, 1876; application filed July 22, 1876.

*To all whom it may concern:*

Be it known that I, JAMES G. WILSON, of the city, county, and State of New York, have invented a new and useful Improvement in Rolling Shutters, which improvement is fully set forth in the following specification, reference being had to the accompanying drawing, in which—

Figure 1:
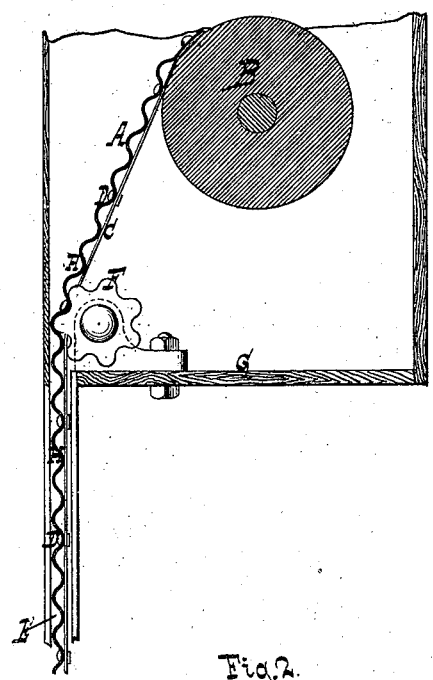
Figure 2:
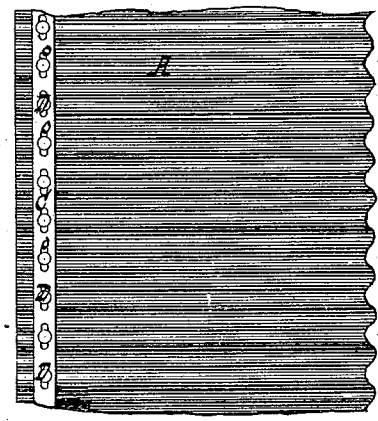

Figure 1 is a vertical section of my improvement. Fig. 2 is a front view of a portion of a shutter provided along its edge with a steel spring or other metal band according to my invention.

Similar letters indicate corresponding parts.

My invention consists in the combination, with a corrugated shutter composed of a continuous sheet of corrugated metal, of metallic bands extending lengthwise along the shutter, the shutters or the bands being provided with slots and fastened together by means of rivets, so as to allow a slight play of the shutter on the bands, to enable the whole to be wound upon a roller, as more fully hereinafter set forth.

The bands are in contact with the surface of the shutter at the convexities of the corrugations, and extend along the shutter in a straight or curved line, and are elastic, so as to wind up along with the shutter without difficulty.

The bands prevent the stretching or pulling out of the corrugations, and when they are arranged along the edges of the shutter or other parts which move in the guiding-grooves of the shutter, they lessen the wear of the shutter and of its corrugations, and also prevent the corrugations from catching against each other or interlocking when the shutter is wound up or unwound; and they enable the shutter to be operated smoothly and with very little noise.

My invention consists, further, in a relieving, anti-friction-toothed roller, one or more, combined with a corrugated shutter in such a manner that the corrugations engage with the teeth of the rollers, and the shutter is thereby kept true and preserved from torsion, and is operated with regularity and uniformity across its whole width.

The letter A designates a corrugated-metal shutter, composed of a continuous sheet of corrugated metal; and B is a shaft, on which it is wound up. Upon the surface of the shutter (one or both surfaces, as may be preferred by the manufacturer) I fasten metallic spring-bands C, arranged lengthwise of the shutter, in contact with its corrugations, and fastened thereto by rivets D or other suitable means. The metallic bands C are thin and elastic, so that they will conform to the curve taken by the shutter when wound upon the shaft B, and will resume their shape when the shutter is unwound. The rivet-holes for the rivets D are slightly elongated, either in the spring-bands C or in the shutter, so as to allow a little play of the spring-band on the shutter when the shutter is being wound up. These elongations are made lengthwise of the spring-bands. The letter O designates the elongated rivet-holes.

I have in this example shown a band, C, consisting of a strip of spring-steel fastened along the edge of the shutter; but I do not restrict my invention to its location along the edges of the shutter, as it may also be placed along the shutter between its edges; but when placed along the edges the bands preserve the shutter more or less from wear against the sides of the guiding-grooves E, in which the edges of the shutter are usually arranged to run.

In order to relieve the shutter of friction as much as possible at the place where it passes into its guides, and to cause it to move true across its whole width, no matter what may be its width, I place toothed rollers F along the line where the shutter leaves the inclosing-case G, or where it enters the guides E, so that the corrugations H of the shutter will engage the teeth of the rollers as the shutter passes down or up, and thus be relieved to some extent from resistance by friction, and be guided evenly and truly across its whole width. The rollers F turn loosely on their journals, and their teeth or cogs are made to fit in the corrugations of the shutter. The shutter is guided by the rollers in its proper course into and out of the guides E, and is relieved and supported along the line where the rollers are arranged; and the rollers have the effect to prevent the jolting of the shutter when it is operated, and cause it to run smoothly and evenly and with little noise.

What I claim as new, and desire to secure by Letters Patent, is—

1. The combination, with the metallic shutter composed of a continuous sheet of corrugated metal, of the elastic bands extending lengthwise along the shutter, and connected therewith by fastening-rivets passing through slots, substantially as described.

2. The combination, with a corrugated shutter, of loose toothed rollers F, arranged and engaging the corrugations of the shutter, substantially as above described.

In testimony that I claim the foregoing I have hereunto set my hand and seal this 18th day of July, A. D. 1876.

JAS. G. WILSON. [L. S.]

Witnesses:
W. HAUFF,
CHAS. WAHLERS.